United States Patent [19]
Rodriguez et al.

[11] Patent Number: 4,481,025
[45] Date of Patent: Nov. 6, 1984

[54] GLASS ANNEALING LEHR

[75] Inventors: Federico B. Rodriguez, Garza Garcia; Rafael B. Mares, Roma Monterrey, both of Mexico

[73] Assignee: Vitro Tec Fideicomiso, Monterrey, Mexico

[21] Appl. No.: 426,615

[22] Filed: Sep. 29, 1982

[30] Foreign Application Priority Data

Dec. 15, 1981 [MX] Mexico ................................. 191449

[51] Int. Cl.³ .............................................. C03B 25/06
[52] U.S. Cl. ...................................... 65/348; 65/350; 65/119
[58] Field of Search ................. 65/119, 348, 349, 350, 65/351, 162; 432/144, 149

[56] References Cited

U.S. PATENT DOCUMENTS

| 1,974,058 | 9/1934 | Wadman | 65/119 |
| 2,725,680 | 12/1955 | Baker | 65/350 |
| 2,754,628 | 7/1956 | Dawe | 65/348 |
| 3,145,092 | 8/1964 | Decker et al. | 65/350 |

Primary Examiner—William Smith
Assistant Examiner—Michael K. Boyer
Attorney, Agent, or Firm—Kemon & Estabrook

[57] ABSTRACT

A lehr for heat treating glass articles is assembled from a series of modules to define an elongated insulated tunnel. A belt conveyor extends throughout the tunnel for moving articles from one end to the other. Duct work connection between the tunnel and the ambient air and associated heating and blower means establish heating, tempering and cooling zones respectively within the lehr in the direction of conveyor movement. Temperature sensors adjacent both flights of the conveyor are linked with a control panel to permit establishment of any desired temperature curves.

1 Claim, 7 Drawing Figures

GLASS ANNEALING LEHR

BACKGROUND OF THE INVENTION

Lehrs for annealing and tempering of glassware are well known. The ware is carried through the lehr which is in the form of a tunnel by means of a conveyor belt. The glass is heated until it reaches annealing temperature, taking a few minutes to reach strain development; afterwards the glass is slowly cooled by temperature control until just below the strain point, below which the permanent strains acquired in cooling no longer exist. The ware is then cooled at a faster rate to ambient temperature.

Early lehrs were manufactured in an integrated manner, formed by huge sections which caused great problems in installation, maintenance and moving, if it were required. Glassware such as bottles, jars, etc., were passed through the lehr close to the tunnel entrance and slowly moved through the heating zone being afterwards passed to a tempering zone where the temperature was raised to around 560° C. and later the articles were cooled until they reached handling temperature. Those lehrs had problems due to sudden entrance of air currents from the cooling zone to the tempering zone which caused either breakage of the articles or ineffective tempering, especially along the length of the cooling zone.

Subsequently the manufacture of lehrs began, using smaller, more manageable modules or sections with integrated heating and cooling systems, thereby gaining great advantages, in that it was no longer necessary to construct the lehr at its intended place of use because of the modular construction. Very efficient transversal cooling systems were created with uniform thermal treatment along the width of the lehr. Characteristically there were air movements inside the lehr impeding air currents along the lehr's length which would otherwise adversely affect the thermal treatment curves.

The developments that have thus far occured in lehrs have been oriented towards better thermal efficiency, faster conveyor belt speed, shorter process time, greater process control, and have tended toward higher productivity for these machines.

One example of prior art lehrs, may be found in U.S. Pat. No. 3,145,092 dated Aug. 18, 1964. This patent describes an improvement in lehrs, especially in the cooling of the glassware after heat has been applied. Basically, the cooling system is in independently regulated sections or zones, to provide constant cooling. The sections have a series of ducts forming right angles that are connected (one to each section) at one end to a transverse wall of the lehr and on the other end to a central duct which extends longitudinally along the upper part of the lehr in a section of the cooling zone. This central duct is connected to a vacuum fan at the entrance to maintain suction inside the cooling section. Each cooling section into which the lehr is divided is independently regulated to provide constant cooling of articles. The air directed inside the tunnel is supplied by a forced air fan, located at the end of the cooling zone.

Another U.S. Pat. No. 3,884,667 dated May 20, 1975, describes a lehr which cools articles by controlling temperature, as the articles pass longitudinally through the lehr. The lehr is formed of a plurality of sections and the articles pass through the various sections in a longitudinal direction by means of a conveyor belt. Each individual section consists of a peripheral insulation inside a rigid structure. Below the roof of each section is a fan which is connected by a shaft extending through the insulation panel to an electric motor. Over one or both sides of the section, heating or cooling elements are provided and the fan sucks the hot or cold air through the upper surface of the conveyor belt and the glassware placed on the belt, directing the air laterally towards the heating element. After passing through the heating element, the air current goes down and flows along the length of the external walls and again passes through the conveyor belt to continue circulating among the articles.

Still another U.S. Pat. No. 3,997,317 dated Dec. 14, 1976, describes a lehr constructed in modules or sections and arranged in a series to form a tunnel in which a conveyor belt is disposed for transporting glassware, such as bottles or other articles to be tempered. Each section has circulation and recirculation ducts above the conveyor belt connected to vertical ducts on opposite sides, with gas burners and electric heating elements, separately or closely fitted next to the vertical ducts. It also has fans positioned in each vertical duct which directs air downwardly toward the gas burners and/or electric heating elements, thereby heating the air, passing it to an area underneath the conveyor belt, and then directing it upwards to heat the articles. This patent also describes means to increase controlled quantities of ambient air at the inlet of each fan.

As can be seen from the lehrs described in the above patents, various types have been developed, each one directed toward increasing production and improving quality of tempering and/or annealing. The majority have heaters and fans in each section, and this increases the expense of energy, equipment, operating and maintenance. Such is the case of the Schraven patent, which uses, one or both sides of each section, heating elements and a fan; or like the Dicks patent, which uses gas burners and electric heating elements on opposite sides and fans positioned in each side.

BRIEF SUMMARY OF THE INVENTION

The lehr of the present invention, avoids the inconveniences of the prior art lehrs and substantially reduces operation and maintenance costs. Energy saving is effected by recirculating the heated air in the heating and tempering zones as well as in the critical and intermediate cooling zones. The glass articles can be tempered by following the tempering curves and controlling the temperature or the amount of air supplied. Complex structures are eliminated, thereby achieving better thermal insulation and easier installation. Rigorous temperature control is effected by continuously comparing the temperature with the optimum curve so it is easily and conveniently balanced by the operators at the control panel.

Taking into account the defects of the prior art, a primary object of the present invention is to provide a lehr for improved thermal treatment of glassware and/or similar articles, which maintains a predetermined ideal annealing curve with optimum use of energy.

Another object is to provide a lehr for thermal treatment of glassware or similar articles, which not only heats the articles in the heating zone, but which also uses the heated air in the tempering and/or annealing, critical cooling and intermediate zones, thereby permitting the use of fewer burners while at the same time maintaining adequate temperature control.

Another object of the present invention is to provide a lehr for the thermal treatment of glassware or similar articles which is easily adaptable to any desired tempering or annealing curve.

Another object of the present invention is to provide a lehr for the thermal treatment of glassware or similar articles, which provides better heat transfer for the articles due to the increase in the heated air stream speed.

Another object of the present invention is to provide a lehr for the thermal treatment of glassware or similar articles, by forming modules with fewer pieces to assemble, thereby reducing maintenance for all its parts.

Yet another object of the present invention is to provide a lehr for the thermal treatment of glassware or similar articles which facilitates easy temperature control throughout the lehr.

A final object of the present invention is to furnish a lehr that is highly effective and efficient at a lower manufacturing cost.

BRIEF DESCRIPTION OF THE DRAWINGS

The new aspects that are characteristic of the present invention are particluarly established in the annexed claims. Nevertheless, because of its organization and its method of operation, along with other purposes and advantages, the invention itself can be better understood by a detailed description of a specific embodiment, when read in relation to the annexed drawings, in which:

DETAILED DESCRIPTION

Figure 1:
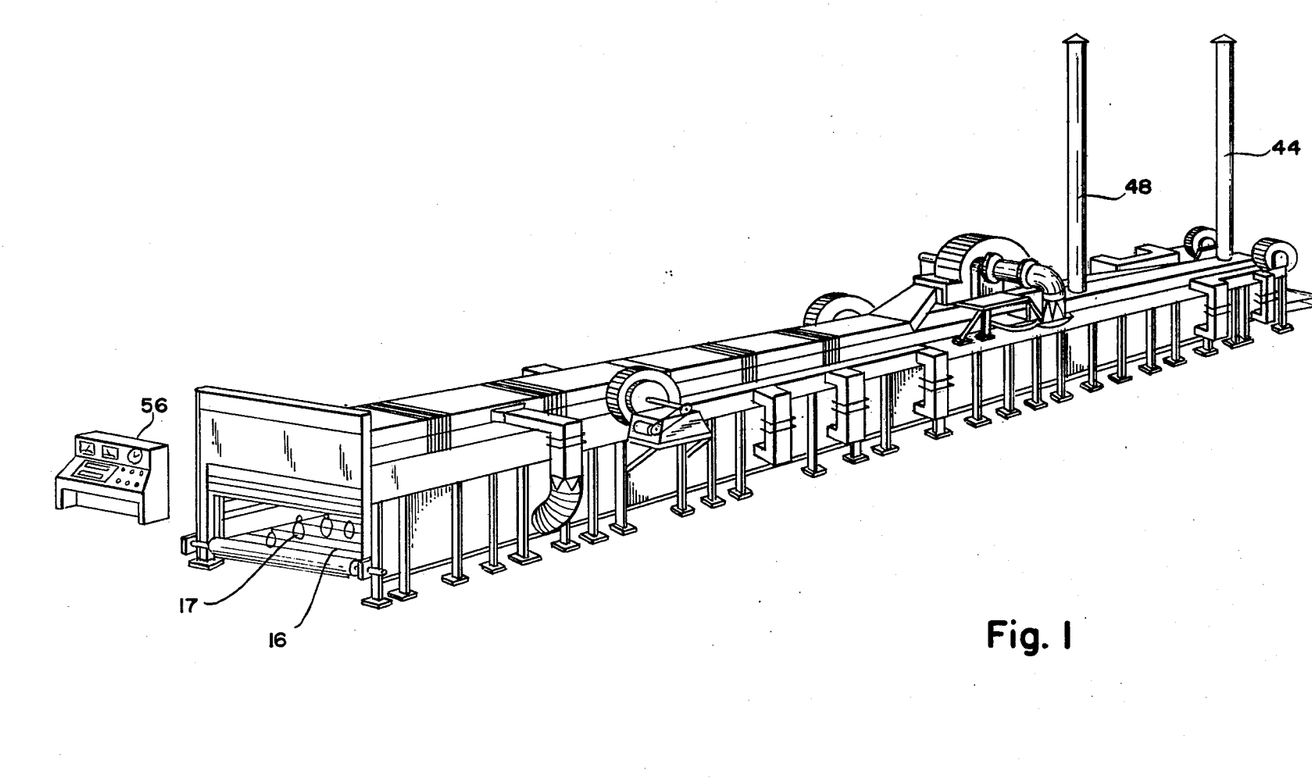
FIG. 1 is a overall perspective view of the improved lehr of the present invention.
Figure 2:
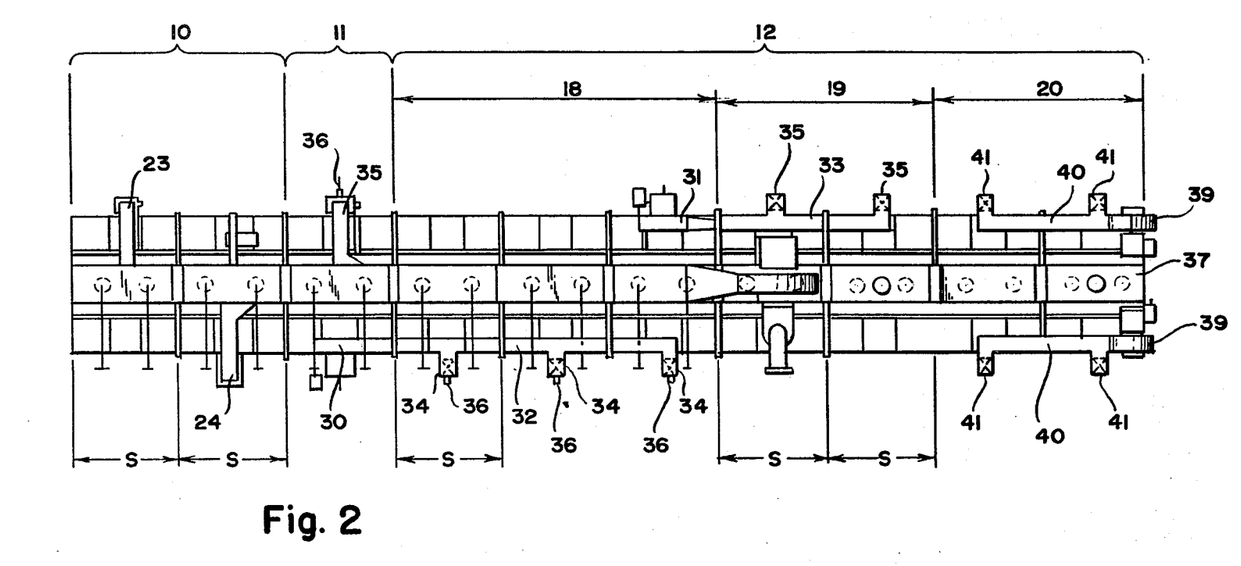
FIG. 2 is a top plan view of the lehr in FIG. 1.
Figure 3:
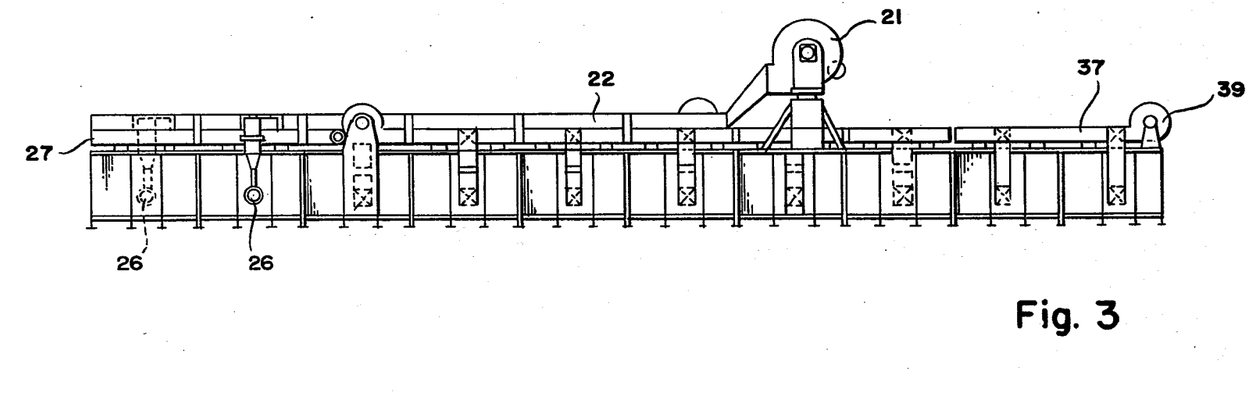
FIG. 3 is a side elevational view of the lehr shown in FIG. 1.

Referring now to the drawings, the components are designated by the same reference numbers in all of the various Figures. Referring first to FIGS. 1, 2 and 3, the lehr includes a heating zone 10, tempering zone 11, and cooling zone 12. These zones are formed in an enclosed space by an upper wall 13, a lower wall 14 and opposite side walls 15 (FIG. 4) which are connected at the corners to define an elongated tunnel, constituted of sections or modules S. A conveyor belt 16, moves the articles 17 through the tunnel for heating in zones 10 and 11 until they reach a certain temperature called the tempering point, and after which they are closely cooled in cooling zone 12, controlling the temperature of the articles, until the permanent strains acquired in cooling no longer exist.

As can be seen more clearly in FIG. 2, the cooling zone 12 consists of various cooling sections, including a critical cooling zone 18, intermediate cooling zone 19 and rapid cooling zone 20.

The temperature of the ware is gradually decreased in zones 18 and 19, and as already mentioned, the permanent strains in the glassware 17 acquired in cooling are eliminated, and afterwards cooled at a faster rate in rapid cooling zone 20.

Figure 4:
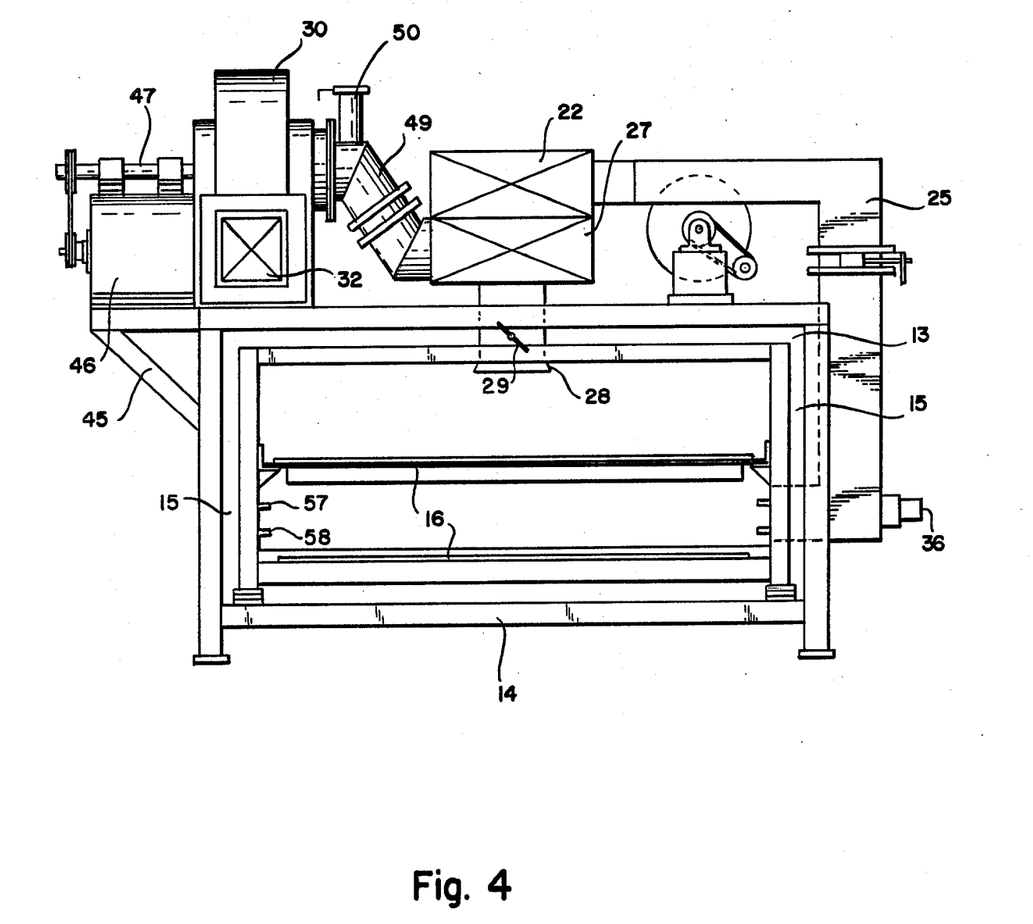
FIG. 4 is a section taken along line 4—4 of FIG. 2, showing the tempering zone of the lehr in the present invention.
Figure 5:
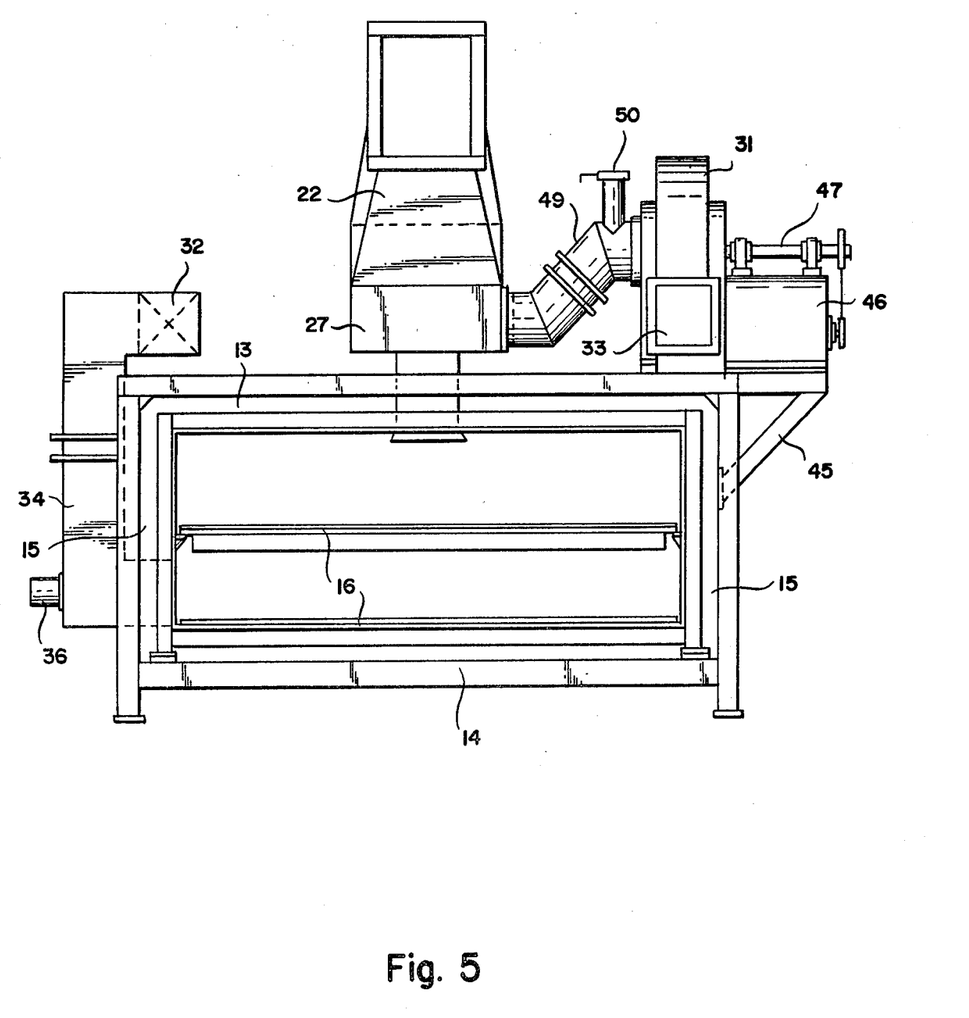
FIG. 5 is another section elevational view taken along the lines 5—5 of FIG. 2, showing part of the lehr's cooling section.

Making more specific reference to FIGS. 2 and 3 the improved lehr of the present invention can be more clearly seen. The principal fan 21 is located above the intermediate cooling zone 19 and delivers air to upper air duct 22, which extends longitudinally along the upper part of lehr from the critical cooling zone 18 to heating zone 10. Exterior ducts 23, 24 and 25 extend at right angles from duct 22 (one for each module or section S) in alternately opposite directions in heating zone 10 and tempering zone 11. They are connected at one end to upper duct 22 and at the other end to the lower part of the side walls 15 below the level of the conveyor belt 16. In this way air from fan 21 flows through the conveyor belt 16, making contact with articles 17 carried thereon (FIG. 4). An automatic burner 26, for each of ducts 23 and 24, is located next to the walls 15 and heats the air to desired temperature for the heating and tempering zones 10 and 11. A lower duct 27 extends longitudinally between heating zone 10 and intermediate cooling zone 19 between the upper duct 22 and the top wall of the lehr. Duct 27 communicates with a further vertical duct 28 (FIGS. 4 and 5) for each module, which at its lower end, communicates through the upper wall 13 for gradual extracting of hot air in zones 10, 11, 18 and 19 and taking air to fan 21 so that the fan recirculates the hot air or combines it with atmospheric air and introduces it once again to heating and tempering zones 10 and 11 to maintain the temperature therein. Each duct 28 includes manual damper regulators 29 to regulate the volume of air extracted. A chimney duct 48 (FIG. 1) connects the lower duct 27 at the end of intermediate cooling zone 19, to permit part of the air that circulates in duct 27 to escape. Lower duct 27 includes fans 30 and 31, located in the upper part of the lehr at the tempering zone 11 and critical cooling zone 18, respectively, in direct relation to the lower duct 27, extracting part of the hot air that passes through said duct 27 and recirculating the hot air, combining it with atmospheric air in the critical cooling zone 18 and intermediate cooling zone 19 thereby uniformly controlling the cooling temperature of the articles being treated. Horizontal ducts 32 and 33 are located in the upper part of the lehr in the critical cooling zone 18 and the intermediate cooling zone 19 respectively, and at one end connect to fans 30 and 31 and at the other end to ducts 34 and 35 at right angles (one for each module) recirculating the hot air along the zones 18 and 19. These ducts 34 and 35 communicate with each module S through opposite walls 15 generating the same flow of air as illustrated in FIG. 5. Dampers with electronic activators for each one of ducts 23, 24, 25, 34 and 35 regulate each other depending on the article, once the tempering and annealing curve have been established. Electric heaters 36 are located next to ducts 25, 35 and are used in the tempering zone 11 and critical zone 18 for an exact temperature control. As can be observed from the preceding, the heating zone 10 not only heats the articles 17, but also heats the air as it is used in tempering, critical cooling and intermediate zones permitting the use of fewer burners and also maintaining temperature control.

Figure 7:
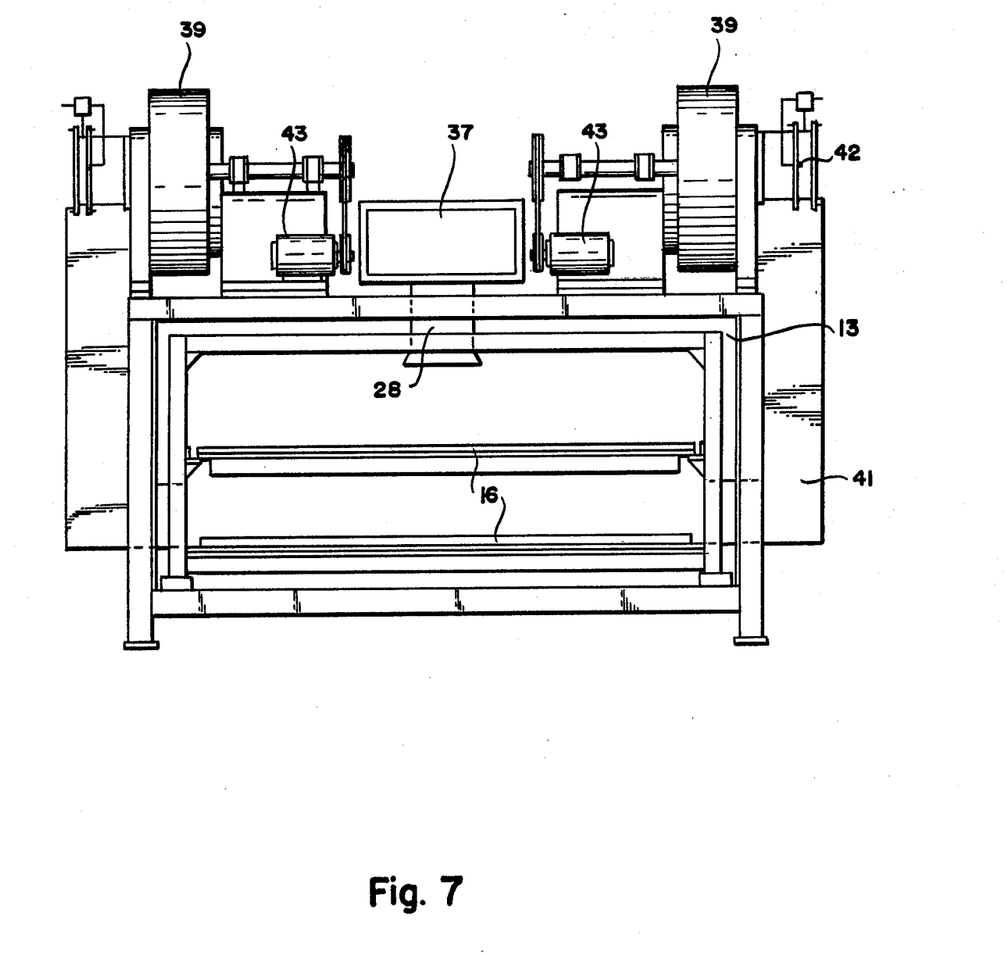
FIG. 7 is another sectional view taken along the lines 7—7 of FIG. 2, showing the lehr's rapid cooling zone.

Rapid cooling section 20 shown in FIGS. 2 and 3 and 7, forms part of cooling zone 12 and since precise temperature control is no longer needed for cooling articles under treatment, it acts independently of ducts 22, 27 and of fan 21. In this section air is introduced at a lower temperature so that it rapidly cools the articles that have been treated in the lehr to permit them to be handled by the operators. This section consists of: a central duct 37 located aligned with duct 27 and along the entire length of zone 20. Vertical ducts 28 (one for each section S) connect with central duct 37 at one end and the other end extends through the upper wall 13 of the lehr to extract the air introduced in the zone 20. Fans 39, one of each side, at the end of zone 20, introduce cooling air to secondary horizontal ducts 40. These horizontal ducts 40, (one for each fan 39), extend along the zone 20 to bring air from the fans 39. Vertical ducts 41 (one for each section) at one end are connected to ducts 40 and at the other end extend through walls 15 and open below the level of the conveyor belt 16.

The volume of air introduced or circulated in cooling zone 20 is regulated by means of dampers 42 for each fan 39, and the fans are run by motors 43 at a predetermined speed. As already mentioned, the entering air generated by the fans 39 circulates through horizontal ducts 40 and vertical ducts 41 passing underneath the conveyor 16 and then leaves through a central duct 37 to enter the atmosphere through the chimney duct 44.

Referring now to FIG. 5, for the details of the arrangement of the fan 31 located in the critical cooling zone (being the same for the fan 30, shown in FIG. 4) a support base 45 is connected to the upper part of the side walls 15 to support an electric motor 46 which is coupled to the shaft 47 of the fan 31. A duct 49 configured as shown connects at its lower end to a lower duct 27 and on its upper end to the fan 31, so that air extracted in the critical cooling zone 18 is introduced by means of fan 31 to ducts 33 and 35, and the cooling zone 19 (here the same case as fan 30, except that through the ducts 32 and 34 and the critical cooling zone 18), uniformly controlling the cooling temperature of the ware. An automatic damper 50 connected to the duct 49, (same connection as the section of fan 30) regulates preheated air or introduces ambient air to cooling zones 18 and 19, according to desired lehr temperature in these zones.

Figure 6:
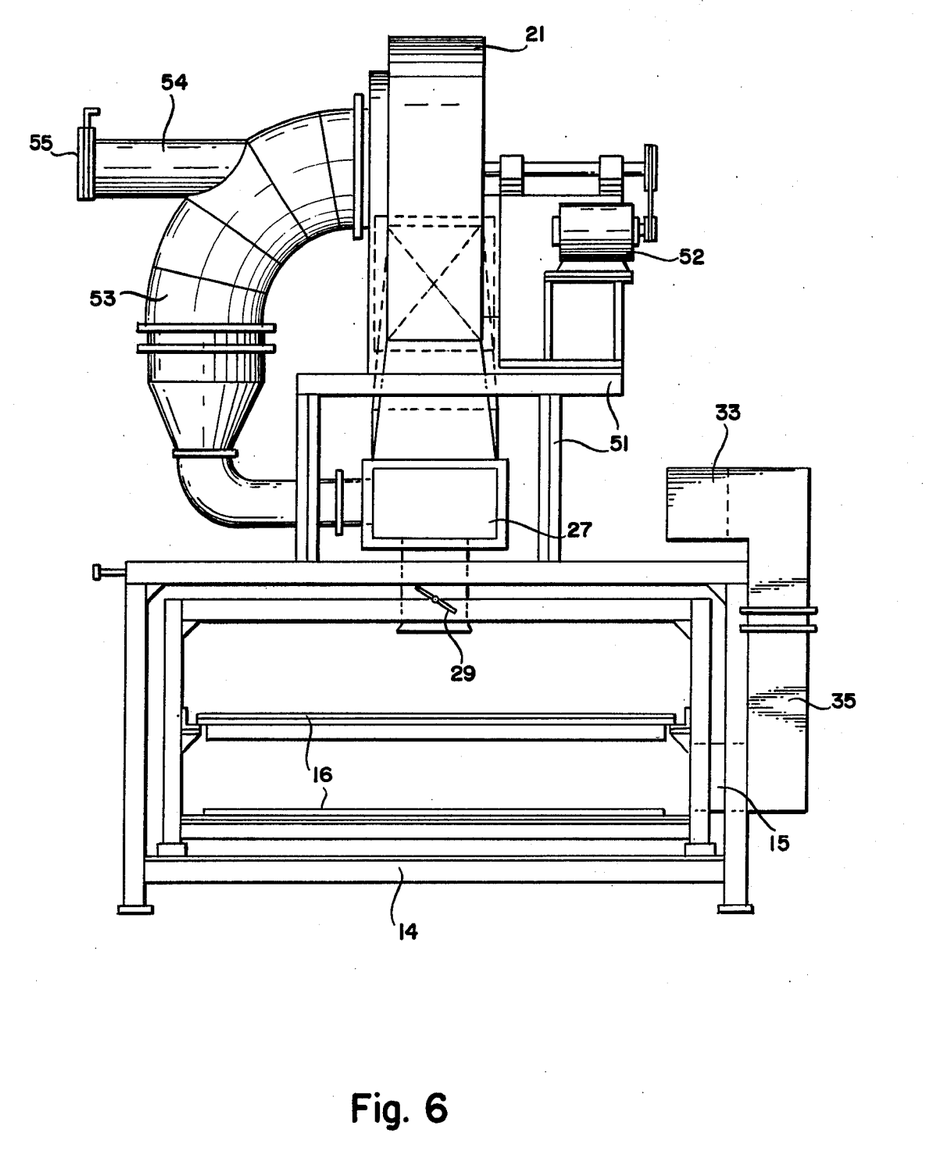
FIG. 6 is a detailed view taken on the lines 6—6 of FIG. 2, showing the arrangement of the principal fan that introduces and recirculates the air along the lehr's length.

Referring lastly to FIG. 6, for a detailed arrangement of the principal fan 21, a support frame 51 positioned on the upper part of the lehr supports a motor 52, coupled to the fan 21. A duct 53 in thr form of a "C" is connected at its lower end to the duct 27 and at its upper wider end to fan 21 and recirculates the preheated air extracted from zones 10, 11, 18 and 19 and reintroduces it to zones 10 and 11. Duct 53 is connected to duct 54 which includes a damper 55 at its end to allow entrance of ambient air to fan 21 when necessary.

The control system of the present invention (FIGS. 1 and 4) consists of: a control panel 56; a series of thermocouples 57 (FIG. 4) located under conveyor belt 16 indicating the temperature of the lehr; another series of thermocouples 58 (FIG. 4) for the temperature control indicator, located adjacent the lower flight of the conveyor belt 16, at the entrance to ducts 22 and 27, and for each fan 30 and 31. These thermocouples send signals to the control panels 56, to regulate the exact temperature control, gauging the opening of the dampers 50 and 55 and/or stopping or starting the burners 26 and electric heaters 36.

Operation of the lehr of the present invention, includes longitudinal transportation of the articles on a conveyor belt through the various sections of the lehr, introduction of forced air from a principal air source to a primary heating and tempering zone, simultaneously heating the air as it is introduced into the lehr; gradual extraction of the hot air from the primary zone and reintroduction into a secondary cooling zone and the principal air course, thereby newly recirculating the air in the primary heating and tempering zone.

This is achieved by means of fan 21 which takes the ambient air by means of duct 54, and introduces it to upper duct 22, to pass it through ducts 23, 24 and 25 and introduce it into the lehr below the conveyor belt 16 to thereby generate a flow path over the ware in each module or section S. The air is heated just before it is introduced under the conveyor by automatic burners 26 located in ducts 23 and 24, and by electric heaters 36 in duct 25, which heat the recirculated air to the temperature selected by the operator. Then, by means of ducts 27 and 28, extraction is balanced by manual damper 29, located in ducts 28, and the extracted air is taken to the principal fan 21 to recirculate it to zones 10 and 11. Part of the heated air that passes through duct 27 is also gradually extracted by fans 30 and 31, located in tempering zone 11 and critical cooling zone 18, and reintroduced through ducts 32, 33, 34 and 35 respectively, thereby in a gradual manner controlling the cooling temperature of the articles that pass through the lehr.

Then, once the ware has reached the rapid cooling zone 20, air is introduced for a higher cooling rate through fans 39 and their respective ducts 40 and 41, rapidly cooling the articles for handling by the operators.

Even though the present lehr has been described in connection with a specific embodiment, one should understand that the lehr has great versatility for modifications and changes in its design according to the requirements of the products that will be thermally treated . . . simply by the addition or elimination of sections or modules.

Also the lehr has great control ease, which can be easily expressed at the convenience of the operator, who can observe the temperature in all zones from the control panel, applying exact temperature control, regulating the adequate volume of air, and adjusting the damper regulators in each fan.

So then, one should understand that the invention is not limited to the disclosed embodiment . . . and it should be evident to a specialist in the field that many different arrangements of the lehr and the process can be implemented. The true spirit and scope of the invention can be seen in the following claims.

I claim:

1. A lehr for the thermal treatment of glass comprising:

a plurality of hollow modules aligned and connected to each other to define an elongated tunnel lehr having heating, tempering, and critical, intermediate and rapid cooling zones in the order named within said tunnel;

conveyor means within said tunnel and extending completely therethrough for transporting articles to be treated so that the articles pass successively through said zones in the order named and are gradually heated, then tempered and finally cooled in the respective zones;

means defining a principal air source located externally on the lehr;

first duct means located externally on the lehr and connecting said principal air source means with the interior of the lehr at points beneath said conveyor to contact articles thereon in said heating and tempering zones;

heating means located in said first duct means to heat the air supplied to said heating and tempering zones;

second duct means also located externally on the lehr and connected to withdraw hot air from the interior of the lehr in said heating and tempering zones and recirculate a portion of it to said principal air source means;

suction means connected to said second duct means;

third duct means connected to said suction means to supply a portion of the heated air in said second duct means to said critical and intermediate cooling zones for uniformly controlling the cooling temperature of the articles therein;

means for supplying cooling air continuously to said rapid cooling zone independently of said first, second, and third duct means; and each of said heating, tempering, critical and intermediate zones of said lehr having means for controlling the temperatures therein.

* * * * *